Sept. 30, 1952  R. B. DOME  2,612,602
NOISE SUPPRESSION CIRCUIT
Filed Nov. 19, 1948
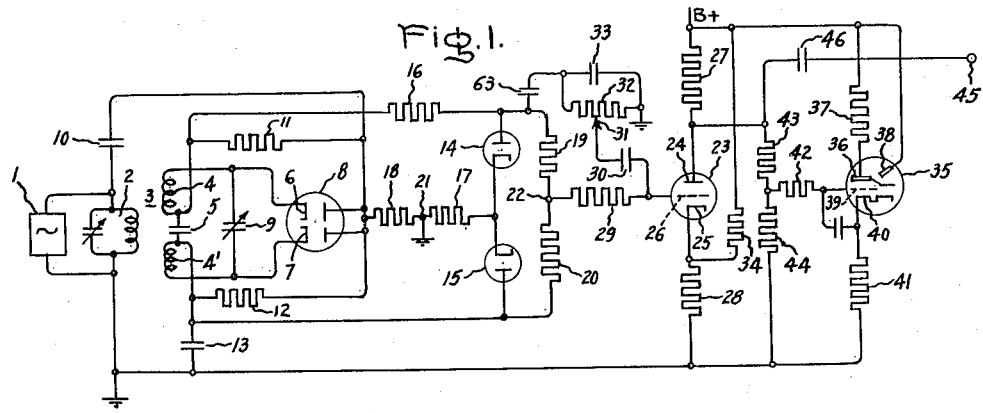
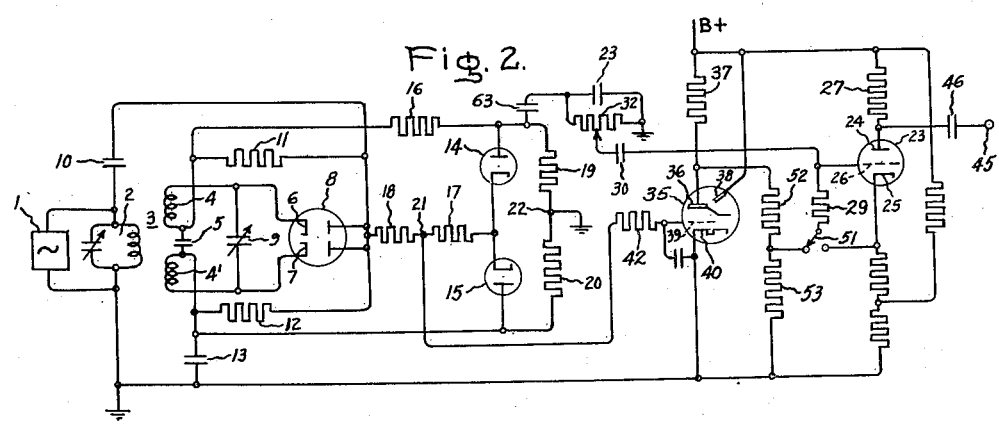
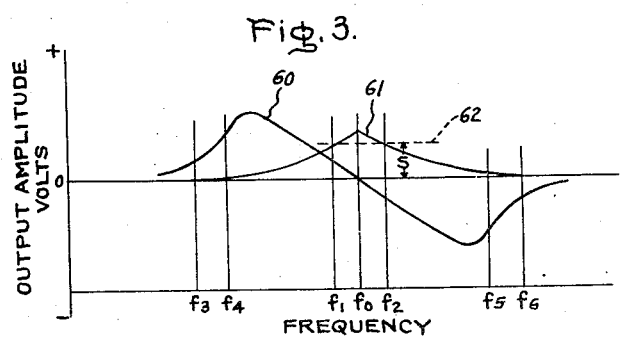
Inventor:
Robert B. Dome,
by  Merton  
His Attorney.

Patented Sept. 30, 1952

2,612,602

UNITED STATES PATENT OFFICE 2,612,602

NOISE SUPPRESSION CIRCUIT

Robert B. Dome, Geddes Township, Onondaga County, N. Y., assignor to General Electric Company, a corporation of New York Application November 19, 1948, Serial No. 61,007

2 Claims. (Cl. 250—20)

My invention relates in general to radio noise suppression circuits of the type commonly known as squelch or muting circuits and more particularly to circuits of this type especially suitable for use in a frequency modulation receiver.

In a frequency modulation receiver employing a balanced frequency discriminator, there are generally three tuning points at which reception of a frequency modulated carrier is possible. Only the central one of these three points is the proper one to insure distortionless reception of a signal conveyed by the carrier. The other two points, commonly known as the side response points, are equally spaced in frequency above and below the desired tuning point. Reception at these side response points is subject to noise and to interference and, in general, provides considerable distortion when the carrier wave is fully modulated. While an experienced operator can usually distinguish between the three tuning points to determine the proper one, a casual operator often experiences difficulty. For this reason, it has been found advisable, in commercial frequency modulation receivers, to provide some visual indicating means for advising the operator of the proper tuning point. Such a visual indicator is described in my United States Patent 2,333,990, issued November 9, 1943, and assigned to the same assignee as the present application.

However, even where visual indicating means are provided to enable the operator to determine the proper tuning point, considerable difficulty is nevertheless often experienced by the causual operator in tuning a frequency modulation receiver. This is caused in part by the tendency of the operator to tune the receiver by ear, that is, in accordance with the volume of sound produced, and to disregard the visual indicator. Moreover, if the balanced frequency discriminator is slightly out of adjustment, as normally happens in any radio receiver after long usage, one of the side response points may provide an output having a larger amplitude than the balanced detection point. This aggravates the situation considerably and the operator is apt to tune to this point in preference to the balanced detection point.

While a frequency modulation receiver is ideally suited for rendering distortionless reception when properly adjusted in the presence of a carrier wave, it is also particularly prone to produce a large output of noise and other disagreeable sounds in the absence of the carrier. From the point of view of the operator, this is an undesirable operating characteristic. The benefit which the operator derives from his receiver would be considerably increased if the receiver were silenced at all times except when properly tuned to a carrier wave of sufficient amplitude to assure distortionless reception. By combining a squelch or muting circuit with a modified version of the tuning indicator circuit disclosed in my aforementioned United States Patent 2,333,990, I have constructed a frequency modulation receiver having such an operating characteristic.

The principal object of my invention is to provide a squelch or muting circuit for a frequency modulation receiver having a balanced discriminator type of detector to insure that there is no audible output at the side response tuning points.

Another object of my invention is to provide a squelch or muting circuit to prevent the reception of interstation noise and interference in a frequency modulation receiver.

A further object is to provide, in combination with an improved muting circuit for preventing the reception of noise, a tuning indicator for assuring optimum tuning and reception in a frequency modulation receiver.

In carrying out my invention, I employ a balanced frequency discriminator providing an output voltage on one of its sides which varies equally and oppositely with respect to an output voltage on its other side in response to the instantaneous frequency of a carrier wave. A signal output is derived from these voltages by utilizing them in series, as is well known in the art, to provide a voltage equal to their difference. In accordance with my invention, a control voltage is obtained from these two output voltages by means of a pair of rectifiers and associated resistors to provide a control voltage one-half the amplitude of the smaller one of the two, and this control voltage is employed to operate both a squelch or muting circuit and a tuning indicator. The output voltages on either side of the balanced discriminator attain equality at the center frequency of the carrier wave which is also the proper balanced tuning point of the discriminator. Since the difference of the direct components of the output voltages is then zero, providing in turn zero signal output for amplitude modulation and noise, this is the proper tuning point of the receiver for insuring distortionless reception. At this point, the control voltage also attains a maximum and is, therefore, suitable for operating a squelch circuit to render operative a normally disabled sound amplifying portion of the radio receiver. Moreover, the control voltage has a suitable amplitude-frequency characteristic for providing an indication of the proper tuning point on a visual tuning indicator.

For additional objects and advantages and for a better understanding of the invention, attention is now directed to the following description and accompanying drawings and also to the appended claims in which the features of the invention believed to be novel are particularly pointed out.

In the drawings:

Figs. 1 and 2 are schematic diagrams of different embodiments of my invention; and Fig. 3 illustrates the operating characteristics of the discriminator and muting circuit of my invention.

Referring to Fig. 1, there is shown a source 1 of frequency modulated waves, which may be the anode circuit of a limiter tube in a conventional frequency modulation receiver, connected to the primary circuit 2 of a discriminator transformer 3. The transformer 3 is provided with a secondary, split into two windings 4 and 4', the adjacent terminals of which are connected together by a capacitor 5 which has a low reactance over the range of frequencies comprising the carrier and its sidebands. The outer terminals of the secondary windings 4 and 4' are connected respectively to the cathodes 6 and 7 of a dual-diode electron discharge device 8. A variable capacitor 9 is connected across the outer terminals of windings 4 and 4' for tuning purposes. One side of the source 1 is grounded and the other side is coupled through a capacitor 10 to the two anodes of device 8 which are connected together. The adjacent terminals of windings 4 and 4' are connected through diode load resistors 11 and 12, respectively, to the anodes of device 8. A coupling capacitor 13 is connected between the inner terminal of winding 4' and ground, this capacitor providing a low impedance path for frequencies within the band of the signal frequencies superimposed as a frequency modulation on the carrier.

Thus connected, the circuit of the transformer 3 and both diodes of the discharge device 8 constitute a well known frequency modulation detector circuit. When the primary and secondary windings of the transformer are tuned to the center frequency of the carrier wave, the phase of the voltage induced in both halves of the secondary winding is in quadrature with respect to the source voltage across the primary winding. By reason of capacitor 10, a voltage is applied to the anodes of the discharge device 8 which is in phase with that across the primary winding and accordingly in quadrature with that existing across the secondary windings 4 and 4', leading one by 90° and lagging the other by 90° when the frequency of the source voltage is exactly equal to the frequency to which the primary and secondary windings of the transformer are tuned. Under this condition, the voltages induced in the windings 4 and 4' add vectorially to the voltage coupled through capacitor 10 to produce equal resultants. However, if the frequency of the source voltage deviates from that frequency, the voltages induced in the secondary windings 4 and 4' depart from the 90° relation and the voltages applied across one of the diode paths become in more nearly aiding relation, whereas the voltages applied to the opposite diode path become in more nearly opposed relation.

Thus, the resultant unidirectional voltages produced across the load resistors 11 and 12 through the rectifying action of the discharge paths of device 8, increase across one resistor and decrease across the other by an amount dependent upon the extent of deviation in frequency of the carrier from the frequency to which the circuits are tuned. The difference between these two voltages is obtained by using the output across resistors 11 and 12 in series, or in other words, by using the output across capacitance 5. The variation of this output with frequency is illustrated by curve 60 of Fig. 3. A detected signal proportional to the deviation in frequency of the carrier is thus available across capacitor 5, and, by providing through capacitor 13 a low impedance path for currents of the signal frequencies from the lower side of capacitor 5 to ground, the signal output is available with respect to ground at the upper side of capacitor 5.

In accordance with my invention, it is desired to utilize the two voltages developed across resistors 11 and 12 to provide, in addition, a voltage to control a squelch or muting circuit in the receiver and also to provide an indication of the condition of tuning of the receiver. This is achieved by producing from these two voltages a voltage which has a maximum value when the receiver is properly tuned, and by operating a muting circuit and a visual indicator from this voltage.

To this end, in accordance with my invention, a pair of diodes 14 and 15 are employed having their anodes connected respectively to the opposite sides of capacitor 5, the anode of diode 14 being connected in series with a resistor 16, while that of diode 15 is directly connected. The cathodes of both diodes 14 and 15 are connected together and, through equal resistors 17 and 18 in series, are connected to the anodes of device 8. Also connected in parallel with diodes 14 and 15 are a pair of equal resistors 19 and 20.

As thus described, the circuit operates as follows: when the receiver is properly tuned to the center carrier frequency, the voltages produced across resistors 11 and 12 are equal. Also, since the votlages on resistors 11 and 12 are of opposite polarity, there is no voltage across resistors 19 and 20. Hence, since resistors 17 and 18 are equal in magnitude, the voltage between point 21 and point 22 is equal to half the voltage across either resistor 11 or 12.

If now, the voltage applied to the circuit shifts in frequency from the center frequency, the voltage across one of resistors 11 or 12 increases with respect to that across the other. Either diode 14 or 15 then becomes conducting to produce across resistors 17 and 18 in series, a voltage equal to whichever is the greater of the voltages across resistors 11 and 12. Also, since resistors 19 and 20 are equal, point 22 at their junction remains at a midpotential with respect to them. Accordingly, the voltage existing between points 21 and 22 is equal to half the amplitude of whichever one of the voltages across resistors 11 and 12 is the smaller. By grounding point 21, a positive voltage with respect to ground will occur at point 22. This positive voltage attains a maximum when the frequency of the voltage applied to the discriminator transformer from source 1 coincides with the center frequency and decreases on either side of the center frequency. Thus, in a frequency modulation receiver employing a local oscillator to convert a received carrier into an intermediate frequency, the voltage developed at point 22 with respect to ground, varies in accordance with curve 61 of Fig. 3. This curve attains a maximum when the local oscillator is adjusted or tuned to produce an intermediate frequency $f_0$, and decreases when the local oscillator is adjusted to produce intermediate frequencies such as $f_1$, or $f_2$, differing from $f_0$.

The muting circuit comprises a triode discharge device 23 having an anode 24, a cathode 25, and a grid 26. Operating potential from a source (not shown in the drawing) indicated at B+, is supplied to the anode 24 through a resistor 27. The cathode 25 is connected to ground through a resistor 28, and the grid 26 is connected to point 22 through a current limiting resistor 29. Device 23 operates as a signal amplifier with signal voltages coupled to its grid 26 through a capacitor 30 connected to a tap 31, on a potentiometer 32 in series with resistor 16 and blocking condenser 63 between the upper side of capacitor 5 and ground. A capacitor 33 connected in parallel with potentiometer 32 serves as a shunt path for high frequency signal voltages and to provide de-emphasis of high frequencies in the signal output. A resistor 34 is connected between the source of operating potential indicated at B+ and cathode 25. This raises the potential on cathode 25 above ground and consequently, results in the application of a negative bias to grid 26 so that device 23 is normally non-conducting.

When a carrier wave is applied to the transformer 3 by the source 1, a positive voltage is developed at point 22 and is applied to the grid 26 of device 23. This positive control voltage varies in accordance with curve 61 of Fig. 3 and attains a peak when the frequency of the wave supplied by source 1 coincides with the frequency $f_0$ to which the discriminator is tuned. By proper choice of the component circuit elements, including resistors 34 and 28 which determine the bias on device 23, a certain value of control voltage may be determined, which value must be exceeded if device 23 is to become conductive. For instance, the broken line 62 of Fig. 3 represents a certain amplitude of voltage, which amplitude must be exceeded by the control voltage if device 23 is to become conductive. Thus device 23 becomes conductive whenever a carrier wave is supplied between the limits of frequency $f_1$ and $f_2$ determined by the intersection of the broken line 62 with the control voltage curve 61. The range $f_1$—$f_2$ in which the bias on the device 23 is relieved, falls entirely within the portion of the discriminator response characteristic providing distortionless reception. On the other hand ranges $f_3$—$f_4$ and $f_5$—$f_6$ correspond to the side response tuning points of the discriminator, and reception at these points results in distortion. Undesirable reception here is prevented by the negative bias on device 23 which prevents it from conducting.

A tuning indicator is provided by a cathode ray device 35 which may be one of a type commonly used in radio receivers and spoken of as a "magic eye." Device 35 comprises an anode 36 connected to the source of operating potential indicated at B+ through a resistor 37, a target electrode 38 connected directly to the source of operating potential, a grid 39, and a cathode 40 which is connected to ground through a resistor 41. A voltage proportional to the control voltage applied to grid 26 of device 23 is available at anode 24, and a portion of this voltage is coupled to grid 39 through a resistor 42 connected to the junction point of a pair of resistors 43 and 44 connected between the anode 24 and ground.

When a carrier wave from a station is tuned in, the unidirectional voltage at the anode 24 drops to a minimum when the control voltage applied to grid 26 achieves a maximum at the frequency $f_0$. This produces a maximum negative bias on control grid 39 of the cathode ray device 40, thereby providing a maximum indication on the target electrode 38. The indication provided on the device 35 is commonly described as "closing the shadow on the magic eye."

The signal output at the anode of device 23 is coupled to an output terminal 45 through a capacitor 46. In a practical receiver, a power amplifier designed to actuate a loudspeaker or other signal reproducing device is connected to terminal 45.

In operation the loudspeaker is normally silenced and no sound output occurs. When a carrier wave, having an amplitude sufficient to overcome the bias on the squelched amplifier device 23 is tuned in, the squelched amplifier becomes conductive and a sound output occurs. The sound output occurs only if the carrier is tuned in at the proper point on the discriminator characteristic to insure distortionless reception. At the same time, the cathode ray device or "magic eye" 35 provides an indication when the point of exact tuning is achieved by the maximum closing of the "eye shadow."

Referring to Fig. 2, I have shown another embodiment of my invention incorporating certain changes over that of Fig. 1. Corresponding parts in the two embodiments have been given the same reference numerals to facilitate comparison. The circuit differs mostly in the provision of the cathode ray including device 35 to operate directly from the control voltage, and thereafter to apply an amplified squelch control voltage to the amplifier device 23 from the anode 36 of the device 35. Since a negative voltage must be applied to the grid 39 of device 35 to close the "eye shadow," this is achieved by grounding point 22 and applying to the grid the voltage resulting at the point 21. This automatically reverses the polarity of the voltage applied to the grid 39 and the control voltage then varies in the same manner as shown by curve 61, only with a reversal in polarity. A further reversal in polarity of the amplified control voltage then occurs at the anode 36 of device 35, and this is applied to the grid 26 of device 23 through resistor 29 and switch 51 connected to the junction point of resistors 52 and 53 connected between anode 36 and ground. The switch 51 is provided for the purpose of disabling the muting action of the squelch circuit, when desired, by moving the switch to its righthand position. This connects resistor 29 to cathode 25 of device 23 and relieves the negative bias on the grid 26. Device 23 then functions at all times as an amplifier for the output voltage across potentiometer 32 and provides an amplified output at terminal 45. The circuit of Fig. 2 has the advantage of permitting permanent disabling of the muting circuit without affecting the operation of the tuning indicator provided by device 35. In all other respects, it behaves in a fashion similar to that of the embodiment of Fig. 1.

While certain specific embodiments have been shown and described, it will, of course, be understood that various modifications may be made without departing from the invention. The appended claims are, therefore, intended to cover such modifications within the true spirit and scope of the invention.

What I claim as new and desire to secure by Letters Patent of the United States is:

1. A noise suppression circuit for a translating network for frequency modulated carrier waves, comprising a balanced frequency discriminator network arranged to receive said carrier waves, said network having a pair of terminals and being arranged to produce signal voltages of a predetermined polarity with respect to a reference point, the output voltage on one terminal of said network varying equally and oppositely with respect to said reference point as compared to that on the other terminal in response to the frequency variation of said carrier waves, the difference of said voltages providing, over a range of frequencies, a signal voltage proportional to the frequency deviation of said carrier waves from a center frequency, a pair of unilateral conducting devices reversely connected in series across said network, each of said devices being poled to increase conduction in response to an increase in magnitude of the voltage at the terminal to which it is connected, a first pair of impedances connected in series across said network, a second pair of impedances connected in series from said reference point to the junction of said devices, whereby a unidirectional control voltage is developed between the junctions of the impedances in said two pairs, a cathode ray tuning device having an anode, a target electrode, and input electrodes, means for impressing said control voltage between said input electrodes, means energizing said cathode ray device for operation as an amplifier of said control voltage, a signal amplifier having an input circuit coupled to said network, means comprising a muting circuit for disabling said amplifier, and means utilizing amplified control voltage developed at the anode of said cathode ray device for inactivating said muting circuit in response to an increase in said control voltage above a predetermined value.

2. A noise suppression circuit for a translating network for frequency modulated carrier waves, comprising a balanced frequency discriminator network arranged to receive said carrier waves, said network having a pair of terminals and being arranged to produce signal voltages of a predetermined polarity with respect to a reference point, the output voltage on one terminal of said network varying equally and oppositely with respect to said reference point as compared to that on the other terminal in response to the variation in frequency of said carrier waves, the sum difference of said voltages providing, over a range of frequencies, a signal voltage proportional to the frequency deviation of said carrier waves from a center frequency, a pair of unilateral conducting devices reversely connected in series across said network, each of said devices being poled to increase conduction in response to an increase in magnitude of the voltage at the terminal to which it is connected, a first pair of impedances connected in series across said network, a second pair of impedances connected in series from said reference point to the junction of said devices, whereby a unidirectional control voltage is developed between the junctions of the impedances in said two pairs, a cathode ray tuning device having an anode, a target electrode, and input electrodes, means for impressing said control voltage between said input electrodes, means energizing said cathode ray device for operation as an amplifier of said control voltage, and an electron discharge device having at least an output electrode, a control electrode and a cathode, means for impressing said signal voltage between said control electrode and cathode, means for biasing said electron discharge device beyond plate current cutoff in the absence of impressed signals, thereby to disable said electron discharge device, and means for impressing amplified control voltage developed at the anode of said cathode ray device between the control electrode and cathode of said electron discharge device in polarity to render said electron discharge device conductive in response to an increase in said control voltage above a predetermined minimum value.

ROBERT B. DOME.

REFERENCES CITED

The following references are of record in the file of this patent:

UNITED STATES PATENTS

| Number | Name | Date |
| --- | --- | --- |
| 2,197,516 | Case | Apr. 16, 1940 |
| 2,263,633 | Koch | Nov. 25, 1941 |
| 2,264,019 | Case | Nov. 25, 1941 |
| 2,273,098 | Foster | Feb. 17, 1942 |
| 2,362,806 | Dome | Nov. 14, 1944 |
| 2,371,397 | Koch | Mar. 13, 1945 |
| 2,392,672 | Koch | Jan. 8, 1946 |
| 2,447,564 | Carnahan | Aug. 24, 1948 |

OTHER REFERENCES

Hemmes: F. M. Detectors, Audio Systems and Special Receiver Circuits (comprising chap. 7 F. M. Broadcasting and Communication Handbook) Section entitled "Squelch Circuits" and Fig. 67, F. M. and Television for August 1945, pages 50, 51 (article begins on page 42).